Patented Nov. 11, 1930

1,781,019

UNITED STATES PATENT OFFICE

LEON H. LARSON, OF KALAMAZOO, MICHIGAN, ASSIGNOR TO THE KALBFLEISCH CORPORATION, OF NEW YORK, N. Y., A CORPORATION OF NEW YORK

COLD-WATER PAINT AND METHOD OF MAKING SAME

No Drawing.  Application filed January 29, 1927. Serial No. 164,657.

My invention relates to improvements in a cold water paint and a method of making it, to the end that the ingredients comprising the paint can be mingled with water and without the use of oil. My invention is intended to produce a simple and economical water mixed paint in such a way that the mixture will be stable, and will produce a paint which can be applied as soon as mixed if desired, or kept until it is desirable to use it. It is intended further to produce a paint which can be used on any surface which is not oily, which will give an enameled surface not dead white, and which can be colored if desired by the use of a pigment. The paint is also made in such a way that it will not spoil or putrefy, but will improve with age and with weathering. When applied the paint is intended also to spread particularly well, and to cover a large surface. It is further intended to produce a paint which will dry after being wetted without discoloration.

In making the paint I use substantially equal parts by weight of basic sulphate of alumina and hydrated lime, or an equivalent amount of quick lime and water. A basic sulphate of alumina would consist of one in which all of the hydroxyl radicals were not replaced by negative radicals. These are well mixed with approximately four times their combined weight of water. After the reaction is completed either by mixing or standing, a mixture of half casein and half water, approximately twenty per cent. by weight is added to the liquid mixture. The mass is mixed well and strained through a suitable strainer. Formaldehyde or some other preservative may be added to prevent decomposition of the casein.

More in detail, the best practice is to pour the sulphate of alumina liquor into a large excess of hydrated lime so that the solution will always be alkaline. The proportions should be substantially as outlined above. If the mixture is kept alkaline, the reaction between the sulphate of alumina and the lime forms calcium aluminate, formula $Ca_3Al_2O_6$, calcium sulphate ($CaSO_4$) and usually with a slight excess of hydrated lime $Ca(OH)_2$. It is important that the mixture be kept alkaline, because if it is allowed to become acid, aluminate hydroxide $Al(OH)_3$ and calcium sulphate are formed and the calcium aluminate becomes unstable and breaks down.

If, however, the mixture is kept alkaline, the calcium aluminate is the chemical formed. It will be seen that if the mixture is kept alkaline the calcium aluminate is maintained in liquid suspension to function as a paint.

Into this mixture is added the additional twenty per cent. by weight of casein and water, preferably in equal parts. It will be noted that as the lime is in excess when the casein is added, calcium caseinate is formed, the casein reacting with the excess of calcium in the lime. As is well known, calcium caseinate is an exceptionally strong binder.

When the mixture is completed as above, the final product comprises calcium aluminate and calcium caseinate, with calcium sulphate $CaSO_4$, and an excess of lime $Ca(OH)_2$, which so far as I am aware is a new paint product and has the characteristics above mentioned.

It will be understood that while this paint is intended primarily to produce a white enamel surface, a pigment can be added if desired to give it another color.

I claim:—

1. An improved cold water paint comprising essentially calcium aluminate and calcium caseinate in liquid suspension in an aqueous solution.

2. An improved cold water paint comprising substantially calcium aluminate and calcium caseinate in suspension in an alkaline aqueous solution.

In testimony whereof, I have signed my name to this specification this 25th day of January, 1927.

LEON H. LARSON.